United States Patent [19]
Klatt et al.

[11] Patent Number: 5,638,582
[45] Date of Patent: Jun. 17, 1997

[54] BELT FASTENER WITH PRE-SET STAPLES

[75] Inventors: Richard A. Klatt, Bolingbrook; David F. Drabek, Plainfield; John H. Winkelman, Naperville, all of Ill.

[73] Assignee: Flexible Steel Lacing Company, Downers Grove, Ill.

[21] Appl. No.: 580,010

[22] Filed: Dec. 20, 1995

[51] Int. Cl.$^6$ ..................................................... B65D 63/06
[52] U.S. Cl. ........................ 24/33 P; 24/33 B; 198/844.2
[58] Field of Search ................................... 24/33 P, 33 B, 24/33 C, 33 M, 31 H; 198/844.2

[56] References Cited

U.S. PATENT DOCUMENTS

| | | | |
|---|---|---|---|
| 3,327,358 | 6/1967 | Schick | 24/33 B |
| 3,581,350 | 6/1971 | McComb | 24/33 B |
| 4,582,505 | 4/1986 | Stolz | 24/33 P X |
| 5,095,590 | 3/1992 | Schick | 24/33 P X |
| 5,157,812 | 10/1992 | Musil | 24/33 P |
| 5,182,933 | 2/1993 | Schick | 24/33 P X |
| 5,236,079 | 8/1993 | Herold | 198/844.2 |

*Primary Examiner*—Peter M. Cuomo
*Assistant Examiner*—Stephen Vu
*Attorney, Agent, or Firm*—Fitch, Even, Tabin & Flannery

[57] ABSTRACT

A combination of a belt fastener having upper and lower plates joined by arcuate hinge loops and staples preassembled in apertures formed in the upper plates is provided with the staples cooperating with the plates to capture an end of a belt between the plates. The edges of the apertures provide the staples with vertically spaced areas of interference fit with the combination of the preassembled staples and fasteners being effective to reduce the time required to install these plate-type fasteners on belt ends while also holding the staples in an upright, pre-set position against forces that would otherwise cause the staple to slide against the aperture edges until a sufficient driving force is applied for driving the legs through belt material to attach the fastener on a belt end. Further, the preassembled staple and fastener herein can be designed such that upon applying the fastening driving force to the preassembled staples, the staples slide through and bear against the surrounding edges of the upper plate apertures against the interference fit and through the thickness of the belt end such that inner curved portions on the staple joining the staple legs to the head or bight section of the staple engages four inner, lower edges around the upper plate apertures in recessed pockets in which the apertures are formed to bend these edges into tangs and to embed the four tangs into the belt.

17 Claims, 5 Drawing Sheets

BELT FASTENER WITH PRE-SET STAPLES

FIELD OF THE INVENTION

This invention relates to belt fasteners having upper and lower plates joined by arcuate hinge loops for stapling to belt ends and, more particularly, to fasteners as described above having staples preassembled thereto in a secure and sturdy manner.

BACKGROUND OF THE INVENTION

Current belt fasteners utilizing staples can be formed from a blank strip of metal which is cut and bent so as to form a strip of connected fasteners with each individual fastener in the strip having a generally flat upper and lower plate joined by arcuate hinge loops. The hinge loops form slots between each other which can receive loops of fasteners attached on another belt end for joining the belt ends together.

To attach the fasteners to a belt end, the belt end is inserted between the upper and lower plates. A belt stop extends from one of the plates to limit insertion of the belt end between the plates. The fasteners upper and lower plates are provided with staple-receiving holes or apertures. When the upper and lower plates are clamped about a belt end, the apertures will be aligned with each other to allow a generally U-shaped staple to be inserted through the aligned apertures in the upper plate of the fastener, through the thickness of the belt end, then through the aligned holes in the bottom plate of the fastener. The portions of the staple legs protruding from the bottom plate are then clinched against an anvil surface to prevent withdrawal of the staple.

After fastener strips are attached to belt ends to be coupled to one another, the belt ends are brought together with the arcuate hinge loops of the fasteners on one belt end inserted into the slots formed between the arcuate hinge loops of the fasteners secured on the other belt end, and vice versa. With the respective arcuate hinge loops in the above mating relation to one another, they cooperate to define a through-bore into which a hinge pin can be inserted to maintain the fasteners in their mated position.

In order to facilitate and speed the insertion of staples into the fasteners described above and the attachment of the fasteners by way of the staples to the belt end, various arrangements of staple guide blocks with anvil surfaces have been proposed. The guide blocks have staple-receiving channels which can be aligned with the apertures in the upper plate of the fasteners such that with the staples inserted therein, the staples will be guidingly slid through the channels so that the pointed ends of the staples project through the apertures in the upper plate of the fasteners. Thereafter, a staple driving tool is driven downwardly through the channels to drive the legs of the fasteners through the belt end and into aligned holes in the underlying lower plate of the fastener supported by the anvil. Examples of such installation tools are shown in U.S. Pat. Nos. 4,111,080 and 4,333,217, both commonly assigned to the assignee herein.

The step of individually loading each of the staples into the guide block of the installation tool can be fairly time consuming and; as such, it is known to preassemble the staples to a strip of plate fasteners in an effort to save time in the attachment process. In these prior plate fasteners having preassembled staples, the staples were mounted in the upper plate apertures with an interference fit simply by increasing the size or diameter of the wire from which the staples were fabricated. The use of heavier gauge material in forming staples drives up staple costs and generally increases the force required to be applied to the staples for driving through belt material and accordingly is not desirable.

With prior plate fasteners having preassembled staples, the staples were supported in the upper plate apertures by generally planar edges around the holes. Pre-mounting of the staples to the upper plate of the fasteners in this manner caused problems as the planar edges supported each of the staple legs at a single point of interference fit along their length. A problem with this type of interference fit is that staples may become loose from the fasteners during shipping so that the staples are misaligned or missing from the fasteners requiring time to correct or replace these staples. Thus, there is a need for an improved interference fit between the staple legs and the upper fastener plate. If the staples are pushed downwardly relative to the upper plate during shipping, the lower ends of the staples may obstruct or block the opening between the upper and lower plates preventing the belt end from being inserted therebetween.

The previously-mentioned '080 and '217 patents disclose apertures in the upper plate which are sized sufficiently large so as to allow the staple legs to pass through the apertures without significant interference and bearing against the aperture edges, and into contact with the belt before being driven therethrough with the driver, as described earlier. An important consideration in design of belt fasteners is the durability and strength of the gripping force exerted by the fastener on the belt end. For example, it is generally understood that as the staples are positioned farther from the edge of the belt, the strength of the attachment is increased, e.g., because unravelling and/or pull-out problems are diminished. One manner of improving the gripping force is by coining or inclining the outboard ends of the upper and lower plates towards one another so that when the fasteners are secured to the belt, the ends of the plates grip into the surface of the belt.

Typically, the apertures for the staples in the plate fasteners are provided in recessed areas, or pockets, formed in respective upper and lower plates so as to provide the fastener with a low profile. In other words, when the staple is driven through the belt material to secure the plate-type fastener on the belt end, the staple head or bight will seat in the upper plate pocket with the protruding ends of the staple legs clinched in the lower plate pockets so that neither the head nor legs protrude from their respective pockets. In this manner, the fastener can be provided with a relatively low profile relative to the belt end as the staple portions seated in the pockets of the upper and lower plates do not project above the plane of the generally flat, relatively thin fastener plates.

In plate fasteners of the type described above, the larger holes formed in the pockets, particularly in the upper plate, to allow the staple legs to slide therethrough, tends to minimize the material in the pocket between the holes. In addition, as the holes are formed near the outboard ends of the plates, the coining of the outboard ends can cause material to be drawn from around the aperture edges further minimizing the fastener material therearound. Thus, there is a need for a better formed pocket and holes in the pocket.

SUMMARY OF THE INVENTION

In accordance with the present invention, a combination of a belt fastener having upper and lower plates joined by arcuate hinge loops and staples preassembled in apertures formed in the upper plates is provided with the staples cooperating with the plates in an improved manner.

Preferably, this is achieved by vertically spacing areas of interference fit between the preassembled staples and fasteners. These vertically-spaced areas of interference fit hold the staples in an upright, pre-set position against forces that would otherwise cause the staple to slide against the aperture edges until a sufficient driving force is applied for driving the legs through belt material to attach the fastener on a belt end. Further, the preassembled staple and fastener may be designed such that inner curved portions on the staple joining the staple legs to the head or bight section of the staple engages the inner, lower edges around the upper plate apertures in recessed pockets and bends these edges into the belt. The preferred staple legs have straight, flat inner sides abutted against a straight inner edge of the pocket wall aperture and with the inner curved bight portions of staples located over and above the straight inner aperture edges. Driving of the bight portions against these straight edge portions bends these four edges into four tangs and embeds these four tangs.

In one form of the invention, the combination includes an upper recessed pocket formed in the upper plate with four edges on the upper recessed pocket engaging outer sides of the respective staple legs in a first plane and with inner edges on the recessed pockets engaging inner sides of respective staple legs in a second, lower plane. This provides vertically-spaced areas of interference fit to hold the staple legs in an upright, pre-set position. It has been found that by closely controlling and coordinating the size and shape of the staple supporting apertures in the upper recessed pocket and the gauge and shape of the wire used to form the staple and by the provision of vertically-offset areas of interference fit, the preassembled staples of the present invention are more resistant to forces which may be inadvertently applied to the staples such as during shipping and would otherwise tend to cause the staple legs to slide through the staple supporting apertures against the edges therearound.

In a preferred form, the interference fit requires a force in the range of about 7 to 11 pounds applied to the staples to cause the staple legs to slide relative to the engaged edges of the upper plate. This resistance to sliding is an improvement over prior preassembled staples and more readily allows the inventive fastener herein to be shipped and transported without fear of dislodging the staples or sliding of the staples through the apertures so as to block the openings between the upper and lower plates of the fastener to the belt end.

The preferred staples have a transversely extending head joined to the staple legs with a curved portion on the staple joining the legs to the head sized to bend down the inner, lower edges of the upper plate at the recessed pockets into the belt. This is in contrast to prior plate-type fasteners utilizing relatively large apertures in the upper plate which do not leave enough material in the upper plate pockets to be embedded into the belt surface.

Preferably, the staple legs are formed to extend at an angle relative to each other to more readily allow portions of the legs to be clinched in the lower plate pocket upon application of a driving force to the staple. With the lower portion of the legs clinched in the lower place pocket in a crosswise fashion relative to one another, the staple is prevented from being withdrawn from the belt end as by a pulling force thereon.

In another form of the invention, a combination of a pair of staples and a belt fastener having an upper plate and a lower plate with the staples being preassembled to the upper plate for attaching the fastener to the belt end is provided. A pair of recessed pockets are formed in the upper plate, each having a bottom recessed wall with opposite ends thereof and bottom wall portions adjacent the apertures. An aperture is formed at the opposite ends of each of the bottom walls with the apertures so formed leaving sufficient amounts of the bottom wall intact so as to allow the staples to drive the bottom wall portions into the belt end. The staples each have a pair of legs and a bight section interconnecting the legs with the bight section having curved portions at the juncture between it and the legs. The legs and apertures are sized to provide an interference fit therebetween so that with the legs mounted in the apertures, the staples are in an upright, pre-set position relative to the plates. The curved staple portions drive the bottom wall portions upon application of an impact force to the staples sufficient to cause the legs of the staples to be driven through the belt end and the bight sections of the staples to be seated against the bottom walls to provide a low-profile fastener and the bottom wall portions to be embedded in the belt end to secure the staples and fastener on the belt end.

Each of the bottom walls can occupy an area greater than that occupied by at least one of the apertures therein and, preferably, the bottom walls occupy an area greater than that occupied by both of the apertures therein. This arrangement and sizing of the apertures relative to the pocket material allows the curved portions of the staples to drive the inner edges of the aperture into the belt.

Preferably, the apertures have a predetermined shape and the legs have a predetermined cross sectional configuration with the predetermined shape and configuration both being other than circular. The apertures predetermined shape can be a first generally rectangular shape having curved ends and the legs predetermined cross sectional configuration can be a second generally rectangular shape having curved ends with the first shape being dimensionally different than the second shape to provide an interference fit between the legs and apertures.

DETAILED DESCRIPTION OF THE PREFERRED EMBODIMENT

Figure 1:
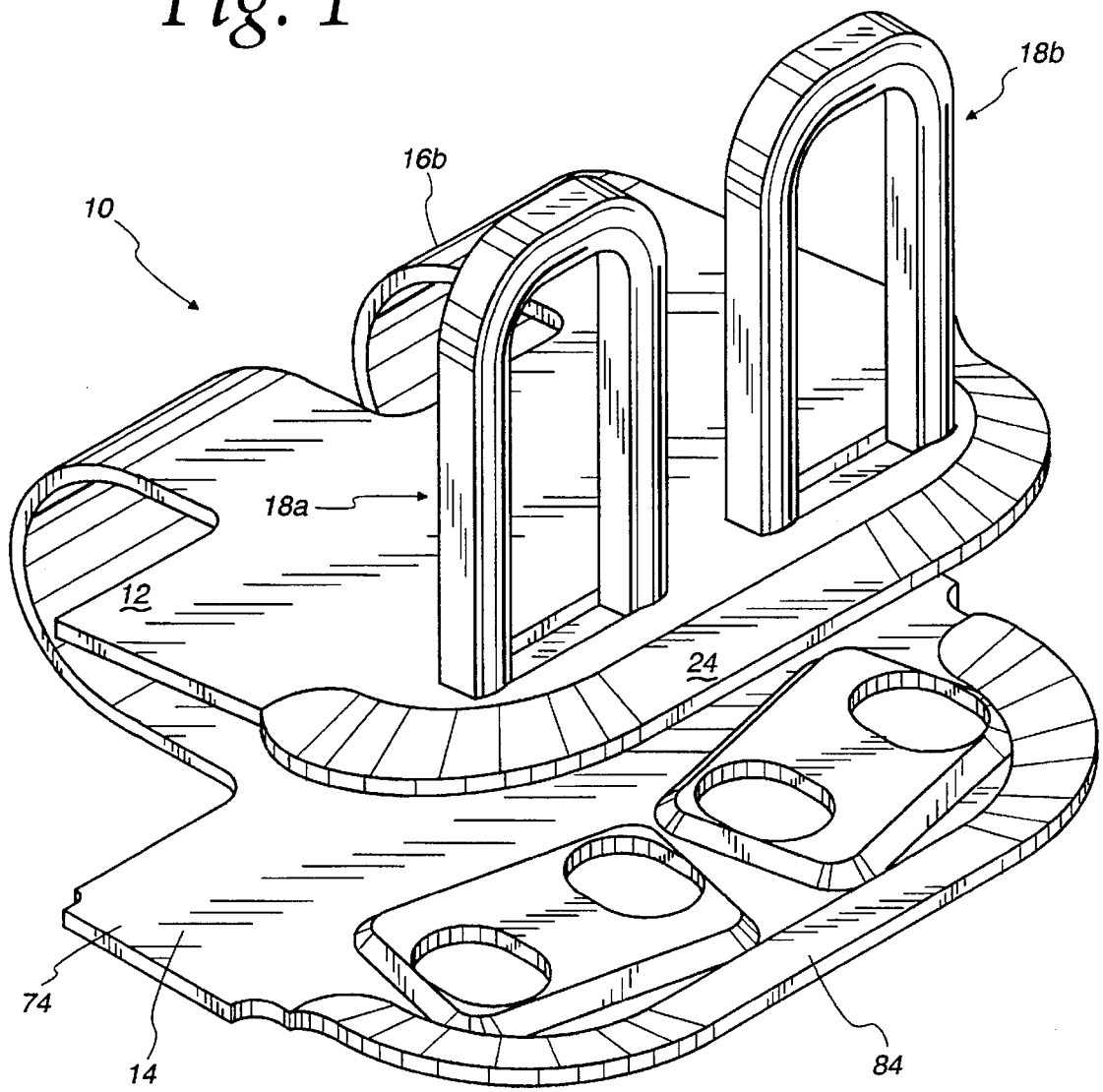
FIG. 1 is a perspective view of a plate-type fastener having preassembled staples according to the present invention.

FIG. 1 illustrates a plate-type belt fastener 10 having upper and lower plates 12 and 14, respectively, connected by a pair of arcuate hinge loops 16a and 16b and generally U-shaped staples 18a and 18b preassembled to the upper plate 12 according to the present invention. Preassembling the staples 18 to the fastener 10 provides several advantages in installation of the fasteners herein over fasteners that require the staples to be assembled to the fastener during the installation operation. As previously mentioned, the plate-type belt fasteners 10 are typically formed such that several of the fasteners are attached in a strip-like fashion to each other to be installed on belt ends. Installation tools are commercially-available for holding the fasteners securely on the belt and in proper alignment while guiding several staples as they are simultaneously driven into the belt.

Figure 2:
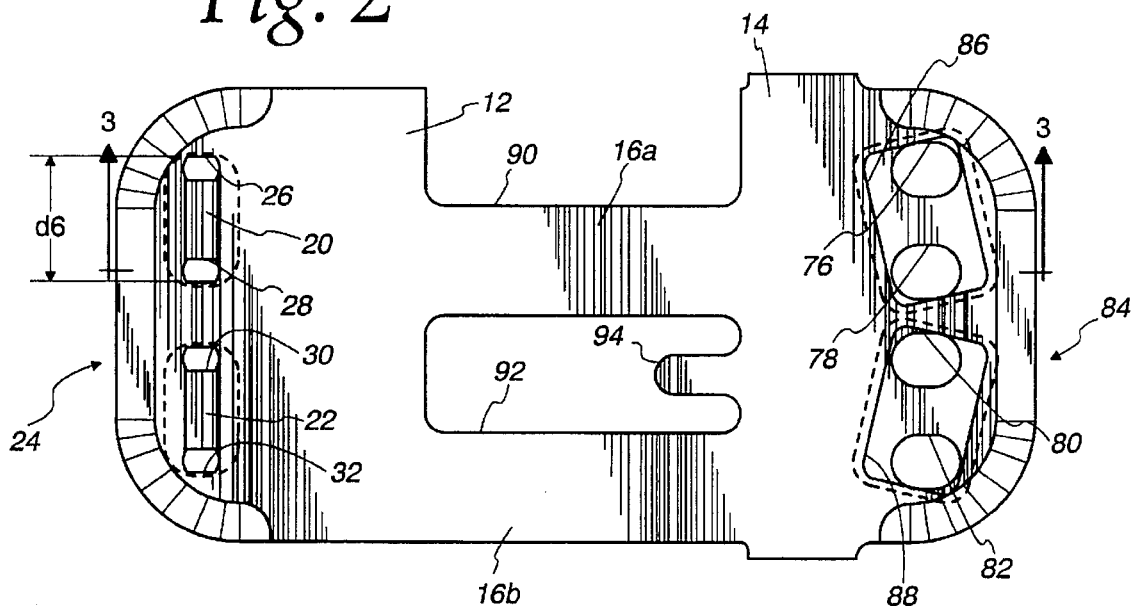
FIG. 2 is a top plan view of the plate-type fastener of FIG. 1 having upper and lower plates before they are formed to be in overlying relation to each other as illustrated in FIG. 1.
Figure 3:
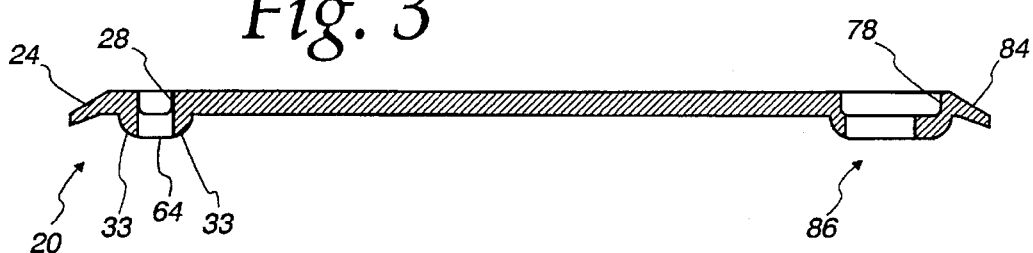
FIG. 3 is a cross sectional view taken along line 3—3 in FIG. 2 showing one of the recessed pockets and one of the apertures formed in the pocket.
Figure 4:
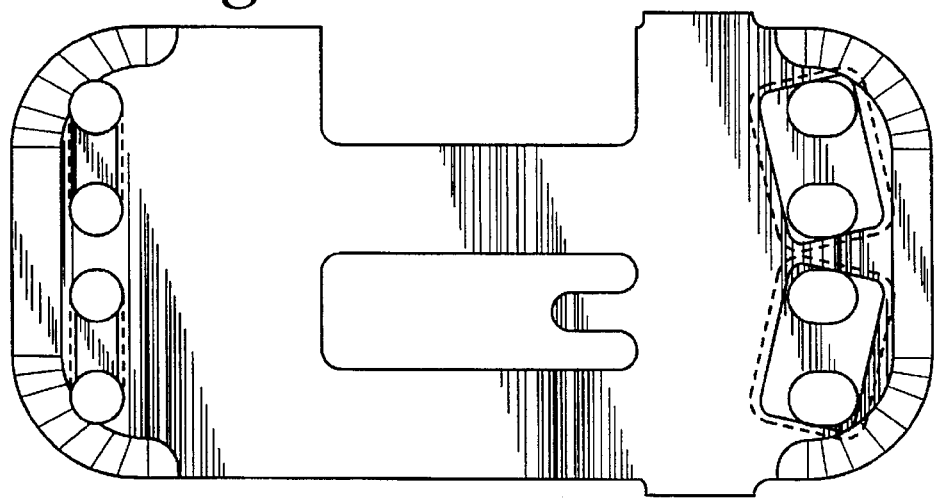
FIG. 4 is a plan view similar to FIG. 2 of a prior art fastener having enlarged circular apertures formed in its upper plate.

To form the plate-type belt fastener 10, a blank strip of metal is formed in individual fastener sections with one fastener section 10a illustrated in FIG. 2 showing the upper plate 12, the lower plate 14 and the arcuate hinge loops 16a and 16b substantially all lying in the same plane as one another. The upper plate 12 has a pair of recessed pockets 20 and 22 formed adjacent the outboard end 24 of the upper plate 12, as by an embossing process. The recessed pockets 20 and 22 extend width-wise across the upper plane with the recessed pocket 20 having staple-receiving apertures 26 and 28 formed at opposite ends of the pocket 20. Similarly, the recessed pocket 22 has staple-receiving apertures 30 and 32 formed at its opposite ends. These upper plate apertures 26–32 are tightly formed in a predetermined shape in their respective pockets as more fully described herein so as to leave a greater amount of fastener material around the pockets as indicated at 33 in FIG. 3 than the larger apertured upper plates in prior fasteners, such as illustrated in FIG. 4.

Figure 5:
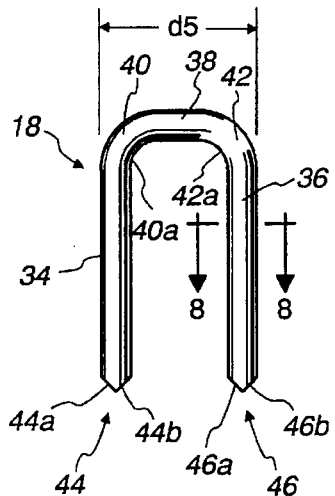
FIG. 5 is an front elevational view of the staple utilized with the plate-type fastener herein as shown in FIG. 1.
Figure 6:
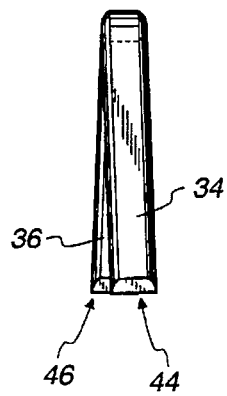
FIG 6 is a side elevational view of the staple of FIG. 5 showing the legs of the staple in offset angled relation to each other.
Figure 7:
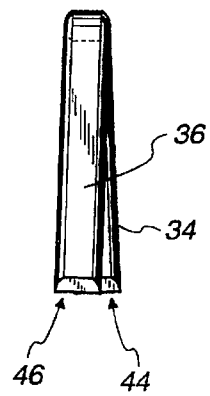
FIG. 7 is an elevational view similar to FIG. 6 taken from the other side of the staple.

The staples 18 are generally small pieces of wire which have been bent into the generally U-shaped form illustrated and include spaced-apart tangs or legs 34 and 36 joined by a head or bight section 38, as best seen in FIG. 5. Curved sections 40 and 42 are formed at the juncture between head 38 and legs 34 and 36 and are provided with a slight radius of curvature which, by way of example, can be in the range of 0.042 inch to 0.048 inch from their inner curved surface 40a and 42a. The ends 44 and 46 of the legs 34 and 36, respectively, have a nail or chisel point formed by cutting the leg ends 44 and 46 to form converging inclined surfaces thereat which meet at the pointed end. The cut surfaces 44a and 44b and the cut surfaces 46a and 46b preferably meet to form a right angle with each other as illustrated.

Figure 9:
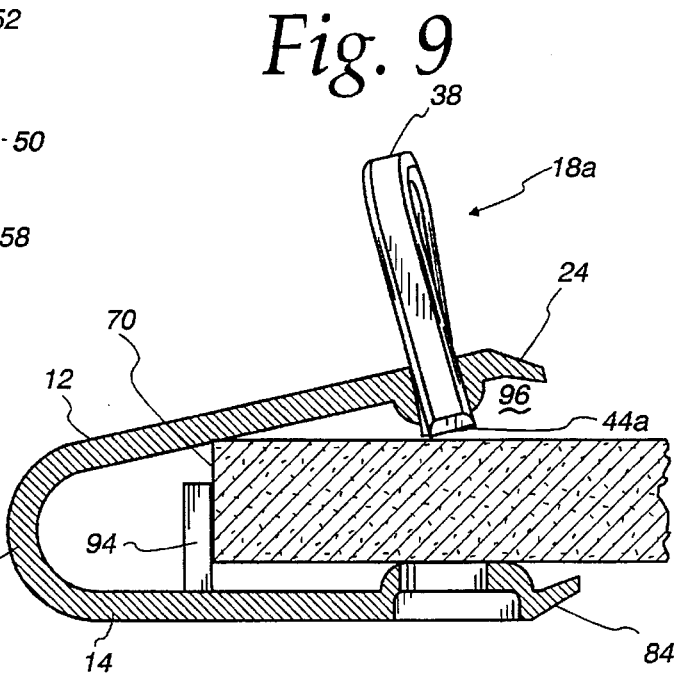
FIG. 9 is a side view, partially in section, of the plate-type fastener and one of the preassembled staples as illustrated in FIG. 1 showing a belt end inserted between the upper and lower plates and against a belt stop extending from the lower plate.

Referring to FIG. 9, the staple-receiving apertures 26–32 all have a predetermined shape and the staple legs 34 and 36 have a predetermined cross-sectional configuration. The aperture predetermined shape and the legs predetermined cross-sectional configuration are sized differently from each other to provide the legs 34 and 36 with an interference fit when inserted in the staple-receiving apertures 26–32. In this manner, the staples 18 can be preassembled to the fasteners 10 in a pre-set, upright position relative to the upper plate 12.

The preferred staples 18 have legs 34 and 36 having a predetermined cross-sectional configuration in the form of a generally rectangular shape having bowed out or curved ends. The preferred staple-receiving apertures 26–32 have a similar predetermined shape in the form of generally rectangular shape with the generally rectangular cross-sectional shape of the staple legs 34 and 36 being dimensionally different than the rectangular shape of the staple receiving apertures 26–32.

Figure 8:
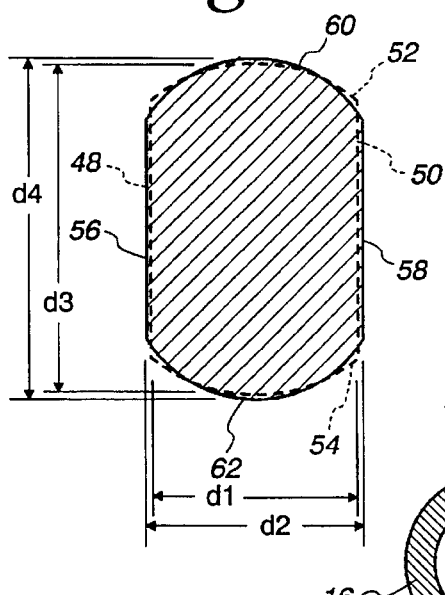
FIG. 8 is a sectional view taken along line 8—8 of FIG. 5 of one of the staple legs and illustrating the interference fit between the leg and one of the upper plate aperture shown in dashed lines.

More specifically and referring to FIG. 8, the staple leg 36 and one of the staple-receiving apertures 26–32 are illustrated to show the difference in dimensions between the legs 34 and 36 and apertures 26–32 for providing the interference fit between the staple legs and apertures. The aperture outline is shown in dashed lines with the length of the generally rectangular shape thereof defined by a pair of substantially parallel straight edges 48 and 50. The width is defined by curved edges 52 and 54 extending between opposite ends of the parallel edges 48 and 50 keeping in mind that with the apertures 26–32 herein these straight edges will lie in planes vertically spaced from each other. For the generally rectangular cross-sectional shape of the staple legs 34 and 36, the length of the rectangular shape is defined by a pair of substantially parallel sides 56 and 58. The width of the staple leg cross-sectional rectangular shape is defined by a pair of curved ends 60 and 62 connecting the straight sides 56 and 58 at either end thereof.

The lateral distance $d_1$ between the edges 48 and 50 of the staple-receiving apertures 26–32 is slightly less than the distance $d_2$ between the sides 56 and 58 of the staple legs 34 and 36. By way of example, the distance $d_1$ can be approximately 0.0445 inch and the distance $d_2$ can be approximately 0.0465 inch thus providing an interference amounting to approximately 0.002 inch in the lateral, widthwise direction between the staple legs 34, 36 and the staple-receiving apertures 26–32.

The curved edges 52 and 54 are curved slightly less than the curved ends 60 and 62 of the staple legs 32 and 34. Accordingly, the distance $d_3$ between the apexes of the curved edges 52 and 54 is slightly less than the distance $d_4$ between the apexes of the curved ends 60 and 62 to provide an interference fit in the lengthwise direction. By way of example and with the distances $d_1$ and $d_2$ as set forth above, the distance $d_3$ can be approximately 0.070 inch while the distance $d_4$ can be approximately 0.072 inch to provide an interference of 0.002 inch between the legs 34, 36 and the staple-receiving apertures 26–32 in the cross-sectional lengthwise direction. The radius of curvature for the aperture curved edges 52 and 54 can be approximately 0.036 inch, while the radius of curvature of the curved end 60 and 62 of the staple legs 34 and 36 is approximately 0.027 inch.

The distance between the staple legs 34 and 36 is substantially the same as the distance between each pair of upper plate apertures 26 and 28 and 30 and 32 so that the staples 18 can be readily mounted to the corresponding upper plate apertures. Again, by way of example, the distance $d_5$ between the outer sides of the staple legs 34 and 36 can be approximately 0.253 inch and the distance between the outer edges of a pair of apertures formed in the upper plate pockets 20 and 22 can be approximately the same, or slightly smaller, such as by 0.002 inch, so that the staple legs 34 and 36 are slightly inclined towards each other when inserted into the upper plate apertures to provide an additional pre-load stabilizing force in addition to the interference fit. In this manner, the aperture straight edges urge the staple legs against the resiliency of the staple material which wants to bend the legs 34 and 36 back to their original substantially parallel, undeformed state.

Figure 11:
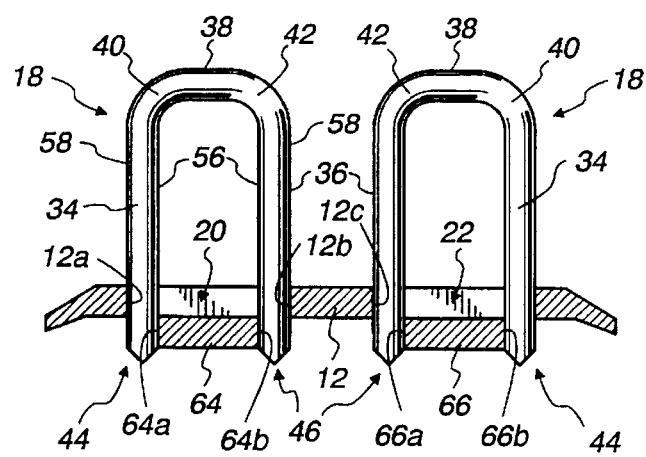
FIG. 11 is a front elevational view, partially in section, of the preassembled staples in their pre-set upright position in the upper plate apertures showing vertically-spaced areas of interference fit between the staples and aperture edges.

To ensure the stability of the staples 18 when inserted in the upper plate apertures so that they do not slide therein or completely separate from the upper plate, such as when jostled or banged about during shipping and transport, the upper plate pockets 20 and 22 and staple-receiving apertures 26–32 therein are formed with the apertures 26 and 28 at opposite ends of the recessed pocket 20 and apertures 30 and 32 at opposite ends of the recessed pocket 22 to provide vertically-spaced areas of interference fit, as best seen in FIG. 11. The pockets 20 and 22 are recessed and each have a bottom wall 64 and 66, respectively. The bottom wall 64 terminates at either end thereof at inner edges 64a and 64b with the inner edge 64a bounding the inner side of the aperture 26 and the inner edge 64b bounding the inner side of the aperture 28. Similarly, the bottom wall 66 terminates at its end at inner edges 66a and 66b with the inner edge 66a bounding the inner side of the aperture 30 and the inner edge 66b bounding the inner side of the aperture 32. The remainder of the upper plate apertures 26–32 are bounded by upper, outer edges 12a–12d on the upper plate 12 outside the pockets 20 and 22.

Preferably, the staples 18 are installed in their pre-set, upright position so that they can withstand a force in the range of 7 to 11 pounds on the staples 18 without movement in their respective apertures 26–32. In this manner, the staple legs 34 and 36 will still slide in their respective apertures 26–32 upon application of driving force to the staples 18 sufficient to force the staples 18 through the belt material but will be maintained in their preset position when encountering the loads and forces that are typical during handling and transport of the fasteners.

The staple legs 34 and 36 in their pre-set, upright position have their pointed ends 44 and 46 extending only slightly beyond the bottom walls 64 and 66, as illustrated in FIG. 11. In one form, the legs 34 and 36 are approximately 0.45 inch long and in their upright, pre-set position in the upper plate 12, the legs extend approximately 0.345 inch above the surface of the plate 12. Of course, and as one skilled in the art will appreciate, differently sized fasteners 10, apertures 26–32 and staples 18 can be provided while still falling within the purview of the present invention. Such sizing can take into account differing belt materials and thicknesses and varying pulley diameters in conveyor drive systems about which the fasteners are to travel.

Figure 12:
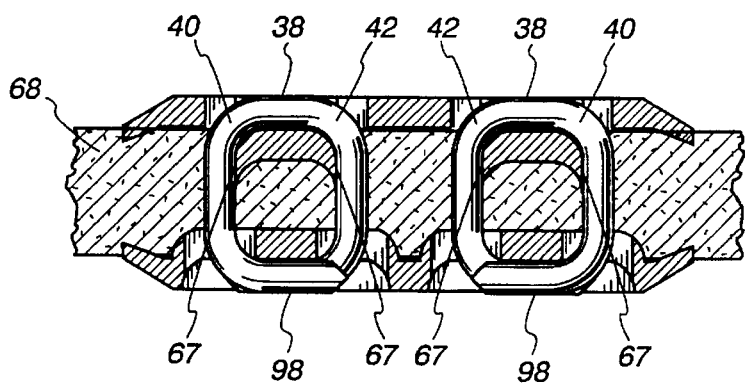
FIG. 12 is a front elevational view, partially in section, similar to FIG. 10, showing the staples driven through the belt with a portion of the upper plate pocket adjacent the inner sides of the staple legs embedded in the belt.

Turning to FIG. 12, the staples 18 are shown as driven into a belt 68 to attach the belt fastener 10 to the end 70 of the belt 68. As can be seen, the apertures 26–32 are sized sufficiently small such that greater amounts of the bottom walls 64 and 66 are intact, particularly near the inner edges 64a, 64b and 66a, 66b, over the apertured pockets as shown in FIG. 4. In addition, the curved portions 40 and 42 of the staples 18, and particularly the inner curved surface portions 40a and 42a, are sized so that when the staples 18 are driven through the belt material any with the staple bights 38 seated in the upper pockets 20 and 22 of the fastener 10, the curved staple surface portions 40a and 42a will engage and bear against the inner portions of the respective bottom walls 64 and 66 to drive these portions into the belt 68. As best seen in FIG. 11, the inner straight sides 56 of the staple legs abut at their lower ends flat and straight, inner edges 64a and 64b of the apertures 26 and 28. The curved portions 40 and 42 are located inwardly of the respective sides 56 of the adjacent staple legs, and hence, inwardly of the straight inner edges 64a and 64b of the apertures. Hence, when these curved sections 40 and 42 are driven against the straight edges 64a and 64b, the straight edges are bent downwardly, as shown in FIG. 12, to form tangs 67 with a sharp lower end and with the tangs 67 embedded in the belt. By contrast, fasteners such as illustrated in FIGS. 4 and 14 where the corresponding upper plate apertures are relatively large in comparison to the apertures 26–32, do not leave sufficient material in their respective pockets to be bent into the belt material similar the pockets 20 and 22 and their apertures 26–32 described herein which allow for the formation of tangs 67.

Figure 13:
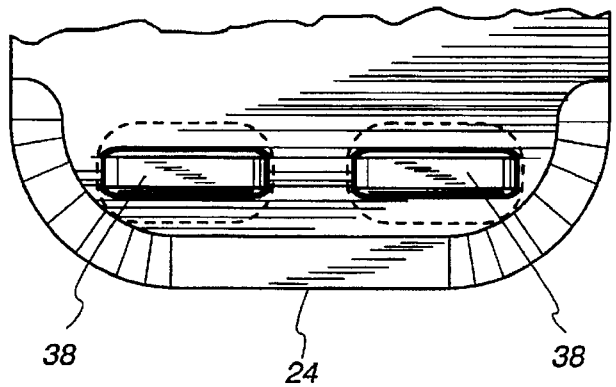
FIG. 13 is a top plan view of a section of the upper plate including its pockets showing the staple heads seated therein.
Figure 14:
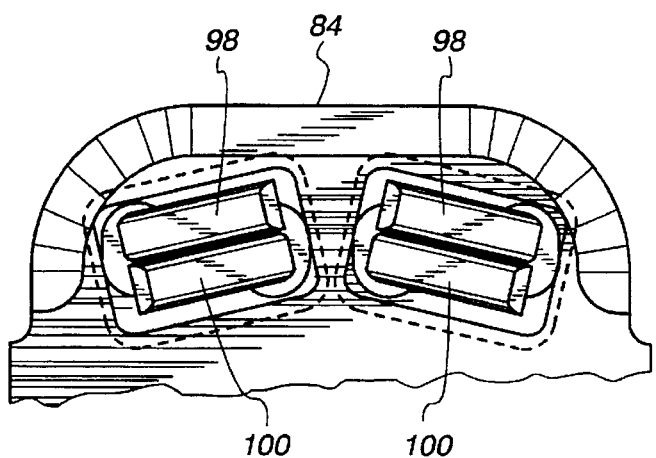
FIG. 14 is a bottom plan view of a section of the bottom plate including its pockets showing lower leg portions of the staples clinched in crosswise fashion relative to each other in the bottom plate pockets.
Figure 15:
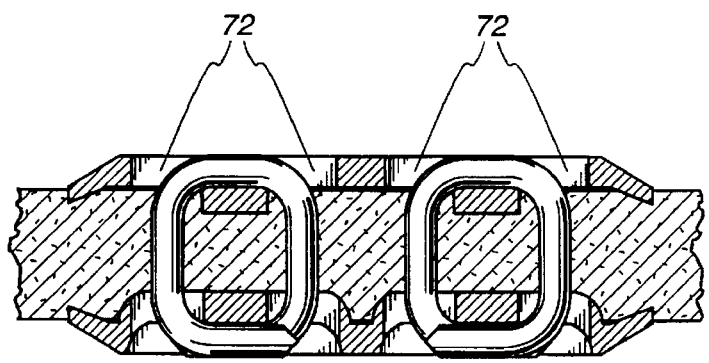
FIG. 15 is a front elevational view, partially in section, of a prior plate-type belt fastener having staples driven through relatively large upper plate apertures and through the belt end and clinched in the lower plate pockets.

Another problem with larger upper plate apertures is that gaps, such as at 72 in FIG. 14, are left between the staples and the surrounding apertures edges leaving a less desirable aesthetic appearance in the belts utilizing these fasteners. This is particularly true as over time the compressed belt material can start to flare up into the gaps 72, thus leaving a frayed appearance to the belt around the staple in the apertures. As best seen in FIG. 13, the staples 18 and apertures 24–32 herein are sized such that gaps, such as at 72, are substantially limited or eliminated providing the inventive fasteners 10 with an improved aesthetic appearance over prior larger apertured fasteners.

Another important consideration in sizing the upper plate apertures 24–32 is control of bending or coining of the outboard end 24 of the upper plate 12 as typically the coining of the outboard end 24 is performed after the staple receiving apertures 26–32 are formed in the upper plate 12. During the coining process where the outboard end 24 is inclined relative to the plane of the upper plate 12 as best seen in FIG. 3, fastener material can be drawn from the hole edges and accordingly can change the shape and size of the apertures 26–32. Thus, to ensure the proper interference fit between the staple legs 34 and 36 and the apertures 26–32, the upper plate coining of the fasteners 10 herein is narrower to help keep the apertures 26–32 tightly formed to maintain their tolerances with respect to the staples 18. Comparing FIGS. 2 and 4, it can be seen that the present fasteners 10 have an inclined outboard end 24 which is slightly narrower across its width than the corresponding outboard end in the illustrated prior art fastener where precise control of the size of the upper plate apertures was not as important. However, in the present invention, the coordination of the size between the staple legs 34 and 36 and their corresponding upper plate apertures 24–32 is critical to allow the staples to be supported and securely maintained in their upright, pre-set position relative to the upper plates 12 and to be driven through the belt so as to bend the inner aperture edges into the belt.

As discussed earlier, the fasteners 10 are preferably formed from a strip of elongate fastener material, such as a strip of steel, which is die cut with individual fastener sections in the shape as seen in FIG. 2. Each fastener section 10a is connected to adjacent fastener sections (not shown) by a lower plate bridge piece 74 so that a strip of the finished fasteners 10, a single such fastener 10 being shown in FIG. 1, are interconnected together to be installed on a belt end.

Similar to the apertures 24–32 of the upper plate, the lower plate 14 has corresponding apertures 76 and 78, 80 and 82 formed near its outboard end 84. The lower plate apertures 76–82 are larger in size than the upper plate apertures 26–32 and thus allow the staple legs 34 and 36 to pass therethrough without any interference when the staples 18 are driven through the belt end 70. Also, similar to the upper plate apertures 26–32, each pair of lower plate apertures 76 and 78, and 80 and 82, are provided in respective recessed areas or pockets 86 and 88 formed in the lower plate 14 as by an embossing process similar to the upper plate pockets 20 and 22. Also, similar to the outboard end 24, the outboard end 84 is inclined as by coining such that when the fasteners are in their final form with the plate 12 in overlying relation to the plate 14, the respective outboard ends 24 and 84 will be inclined toward each other for gripping the belt surface.

Figure 10:
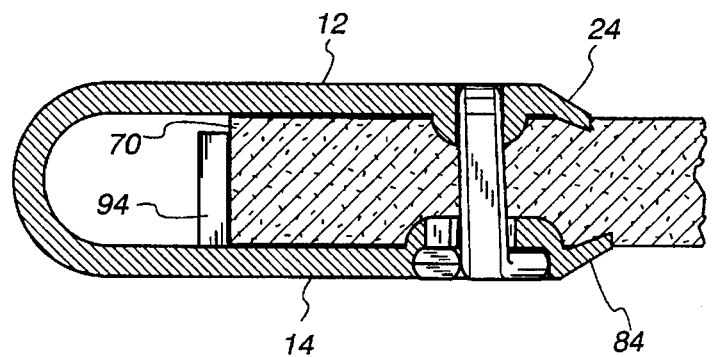
FIG. 10 is a side view, partially in section, similar to FIG. 9 showing the staple driven through the belt end with portions of the staple legs clinched in the lower plate pocket.

With reference to FIG. 2, the arcuate hinge loops 16a and 16b are preferably formed by die cutting an outer cut-out section 90 and an inner window cut-out section 92. Inner window cut-out section is stamped out so that a tab portion 94 extends from the rear of the lower plate 14. After the staples 18 have been inserted into their corresponding upper plate apertures 26–32 in their upright, pre-set position relative to the upper plate 12, the upper plate 12 is folded over about the hinge loops 16 until it is in overlying relation relative to the lower plate 14. Preferably, the plates form an angle in the range of approximately between 70° and 78° with one another depending on the size of the fastener 10 and the belt type and size intended for use with the fastener 10. The hinge loops 16a and 16b have an arcuate section which can mate with loops 16 of fasteners 10 on another belt end to provide a through opening for a hinge pin. The tab portion 94 is also bent with respect to the lower plate 14 so that it extends upwardly at a right angle thereto, as best seen in FIGS. 9 and 10.

In practice, a belt end 70 is inserted into the opening 96 formed between the upper and lower plates 12 and 14 until the belt end 70 engages the tab stop 94. The strip of fasteners 10 can be maintained in position on the belt end 70 by inserting the fasteners 10 into the channel of an installation tool as described earlier with the guide block pivoted to its open position to accept the fasteners 10 therein. Thereafter, the guide block is pivoted to clamp the upper plate 12 against the top of the belt 68 adjacent the belt end 70 causing the outboard ends 24 and 84 of the upper and lower plates 12 and 14, respectively, to grip and/or bite into the belt. Finally, the driver is utilized to transmit an impact force to the heads 38 of the staples 18 driving the pointed ends 44 and 46 of the respective staple legs 34 and 36 into and through the belt material to maintain the plates 12 and 14 clamped about the belt end 70 with inner edge portions 64a and 64b and 66a and 66b of the apertures 26–32 embedded in the belt 68. Thus, the inventive fasteners 10 utilizing the preassembled staples 18 as described herein with the closely controlled and coordinated sizing with respect to the staple receiving apertures 26–32 increase the speed in installation while securely holding the staples in a preset position even during shipping where forces can inadvertently be applied to the staples 18.

As previously described, the staples 18 can have their legs 34 and 36 canted with respect to each other so that as they are driven through the belt material, they will extend through lower plate openings 76 and 78 and 80 and 82 and be spaced in a fore and aft direction from each other when they engage the anvil surface of the installation tool. The pre-load cant provided to the legs 34 and 36 assists in guiding the portions 98 and 100 once they engage the anvil surface to be bent over and moved in a crosswise parallel direction relative to one another, as best seen in FIG. 14. By spacing the ends of the staple 18 in this manner, the ends will not meet as they are being clinched against the anvil surface and instead will move past each other and seat adjacent each other in a crosswise fashion in the lower plate pockets 86 and 88. The canted legs 34 and 36 thus provides the staples 18 with more consistent and improved clinching of their end portions 98 and 100 in the lower plate pockets 86 and 88. FIG. 10 illustrates the staples 18 driven through the belt material with the fasteners 10 in their final attached state on the belt end 70.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. In a belt fastener having an upper and a lower plate joined by arcuate hinge loops and a staple cooperating with the plates to capture an end of a belt between the plates, the combination comprising:

an upper recessed pocket formed in the upper plate and having a pair of spaced staple supporting apertures at opposite ends of the upper pocket;

a lower recessed pocket formed in the lower plate and having a pair of staple receiving apertures at opposite ends of the lower pocket with the upper pocket apertures substantially aligned with the lower pocket apertures;

a staple having a pair of legs with the staple preassembled to the fastener by mounting of the legs in the upper pocket apertures;

outer edges on the upper plate spaced apart at a first predetermined distance;

outer side edges of the legs of the staples being spaced apart at a distance greater than the predetermined distance until forced inwardly by said outer edges of the upper plate to provide an upper and outer interference fit engaging outer sides of the respective staple legs in a first plane; and inner edges on the upper plate within the upper plate recessed pockets being spaced apart a distance greater than distance between the engaging inner sides of the respective staple legs in a second plane lower than the first plane to provide a second lower interference fit, the upper outer and lower inner interference fits providing vertically spaced interference fits to hold the staple legs in an upright pre-set position.

2. A belt fastener in accordance with claim 1 wherein the interference fit requires a force in the range of about 7 to 11 pounds applied to the staples to cause the staple legs to slide relative to the engaged edges of the upper plate.

3. A belt fastener in accordance with claim 1, the staples having a transversely extending head joined to the staple legs, and an inner curved portion on the staple joining the legs to the head sized to bend down the inner, lower edges of the upper plate at the recessed pockets into the belt.

4. The combination of claim 1 wherein the upper pocket has portions adjacent the upper pocket apertures which are embedded in the belt end as the staple legs are driven into the belt end.

5. The combination of claim 4 wherein the upper pocket portions include the inner edges of the apertures.

6. In a belt fastener having an upper and a lower plate joined by arcuate hinge loops and a staple cooperating with the plates to capture an end of a belt between the plates, the combination comprising:

an upper recessed pocket formed in the upper plate and having a pair of spaced staple supporting apertures at opposite ends of the upper pocket;

a lower recessed pocket formed in the lower plate and having a pair of staple receiving apertures at opposite ends of the lower pocket with the upper pocket apertures substantially aligned with the lower pocket apertures;

a staple having a pair of legs with the staple preassembled to the fastener by mounting of the legs in the upper pocket apertures;

outer edges on the upper plate engaging outer sides of the respective staple legs in a first plane; and inner edges on the upper plate within the upper plate recessed pockets engaging inner sides of the respective staple legs in a second plane lower than the first plane to provide vertically spaced areas of interference fit to hold the staple legs in an upright pre-set position, the upper pocket apertures having a first predetermined generally rectangular shape including a length and a width with the length of the first rectangular shape being defined by a pair of substantially parallel straight edges and the width of the first rectangular shape being defined by a pair of curved edges connecting the straight edges and each having a first predetermined radius of curvature, and the staple legs having a second predetermined generally rectangular cross-sectional shape including a length and a width with the length of the second rectangular shape being defined by a pair of substantially parallel sides and the width of the second rectangular shape being defined by a pair of curved ends connecting the straight sides and each having a second predetermined radius of curvature less than the curved edges first predetermined radius of curvature.

7. The combination of claim 6 wherein the aperture parallel straight edges are spaced at a first predetermined distance and the leg parallel sides are spaced at a second predetermined distance greater than the parallel straight edges first predetermined distance.

8. The combination of claim 1 wherein the staple legs extend at an angle relative to each other to allow portions of the legs to be clinched in the lower plate pocket upon application of a driving force to the staple.

9. In a belt fastener having an upper and a lower plate joined by arcuate hinge loops and a staple cooperating with the plates to capture an end of a belt between the plates, the combination comprising:

an upper recessed pocket formed in the upper plate and having a pair of spaced staple supporting apertures at opposite ends of the upper pocket;

a lower recessed pocket formed in the lower plate and having a pair of staple receiving apertures at opposite ends of the lower pocket with the upper pocket apertures substantially aligned with the lower pocket apertures;

a staple having a pair of legs with the staple preassembled to the fastener by mounting of the legs in the upper pocket apertures;

outer edges on the upper plate engaging outer sides of the respective staple legs in a first plane; and inner edges on the upper plate within the upper plate recessed pockets engaging inner sides of the respective staple legs in a second plane lower than the first plane to provide vertically spaced areas of interference fit to hold the staple legs in an upright pre-set position, a second recessed pocket being formed in the upper plate with each upper plate pocket having a pair of spaced non-circular staple supporting apertures and a second recessed pocket being formed in the lower plate with each lower plate pocket having a pair of staple receiving apertures aligned with corresponding upper plate staple supporting apertures.

10. The combination of claim 1 wherein a bridge piece extends between lower plates of adjacent fasteners to connect a plurality of fasteners together in a strip of fasteners having pre-set staples mounted thereto for attachment to a belt end.

11. A combination of a pair of staples, a belt end and a belt fastener having an upper plate and a lower plate with the staples being preassembled to the upper plate for attaching the fastener to the belt end, the combination comprising:

an aperture formed at the opposite ends of each of the pocket bottom recessed walls with the apertures; the staples each having a pair of legs and a bight section interconnecting the legs with the bight section having curved portions at the juncture between said bight section and the legs;

the pair of recessed pockets in the upper plate each having bottom wall portions adjacent the apertures;

the legs and apertures being sized to provide an interference fit therebetween so that with the legs mounted in the apertures the staples are in an upright pre-set position relative to the plates; and inner, lower edges about the apertures in the recessed pockets having been deflected by the curved staple portions to form tangs which are embedded in the belt end.

12. The combination of claim 11 wherein each of the bottom walls occupy an area greater than that occupied by at least one of the apertures therein.

13. The combination of claim 12 wherein the inner, lower edges about the apertures are straight walls located inwardly toward the staple legs of the curved staple portions so that the curved staple portions will bend and embed the tangs into the belt.

14. The combination of claim 11 wherein the upper plate has portions adjacent the apertures and the apertures are bound by the bottom wall portions and upper plate portions to provide vertically spaced areas of interference fit to securely hold the staples in their upright pre-set position relative to the plates.

15. The combination of claim 11 further including a pair of recessed pockets in the lower plate each having a pair of staple receiving apertures at opposite ends thereof with the apertures of the upper plate pockets capable of being substantially aligned with the apertures of the lower plate pockets.

16. A combination of a pair of staples and a belt fastener having an upper plate and a lower plate with the staples being preassembled to the upper plate for attaching the fastener to a belt end, the combination comprising:

an aperture formed at the opposite ends of each of the pocket bottom recessed walls with the apertures; the staples each having a pair of legs and a bight section interconnecting the legs with the bight section having curved portions at the juncture between said bight section and the legs;

the pair of recessed pockets in the upper plate each having bottom wall portions adjacent the apertures;

the legs and apertures being sized to provide an interference fit therebetween so that with the legs mounted in the apertures the staples are in an upright pre-set position relative to the plates; and inner, lower edges about the apertures in the recessed pockets for being deflected by the curved staple portions to form tangs which are embedded in the belt end, the apertures having a predetermined shape and the legs having a predetermined cross-sectional configuration with a substantially non-circular predetermined shape and configuration.

17. The combination of claim 16 wherein the apertures predetermined shape is a first generally rectangular shape having curved ends and the legs predetermined cross-sectional configuration is a second generally rectangular shape having curved ends with the first shape being dimensionally different than the second shape to provide an interference fit between the legs and apertures.

* * * * *